Jan. 13, 1970   N. H. LIEB ET AL   3,488,850
COLLET FOR STRAIGHT HANDPIECE

Filed March 9, 1966   2 Sheets-Sheet 1

INVENTORS.
NATHANIEL H. LIEB
ANTHONY J. TURCHI
GREGORY W. BROOKS
BY
Caesar, Rivise, Bernstein
and Cohen ATTORNEYS.

INVENTORS.
NATHANIEL H. LIEB
ANTHONY J. TURCHI
GREGORY W. BROOKS

BY Caesar, Rivise, Bernstein and Cohen
ATTORNEYS

United States Patent Office 3,488,850
Patented Jan. 13, 1970

3,488,850
COLLET FOR STRAIGHT HANDPIECE
Nathaniel H. Lieb, Philadelphia, Anthony J. Turchi, Bala Cynwyd, and Gregory W. Brooks, Havertown, Pa., assignors to Star Dental Manufacturing Co., Inc., also known as Star Dental Manufacturing Company, Inc., and Star Dental Mfg. Co., Inc., Philadelphia, Pa., a corporation of Delaware
Filed Mar. 9, 1966, Ser. No. 533,087
Int. Cl. A61c 1/08
U.S. Cl. 32—26
8 Claims

ABSTRACT OF THE DISCLOSURE

A dental handpiece comprising a housing and a chuck rotatably mounted within the housing. The chuck includes a collet having a hollow bore with a plurality of jaws at both ends of the bore. The jaws are formed by slots projecting longitudinally inward from both ends of the collet, with the slots bypassing each other. A dental burr is secured within the collet by the compressing of the jaws at both ends of the collet.

---

This invention relates to a collet for a dental handpiece, and more particularly, to a chuck arrangement adapted for use in a straight handpiece.

In our co-pending application Ser. No. 346,336, filed Feb. 20, 1964, now Patent No. 3,349,490, there is disclosed a novel air-driven straight dental handpiece. The dental burr is held within the handpiece by a spring loaded collet. Although the spring loaded collet works efficiently and effectively for its intended purpose, the collet of this invention possesses a number of advantages over the prior spring loaded collet. Among these advantages are greater concentricity of the rotating burr, less noise during use, and a more positive lock or hold on the burr.

It is therefore an object of this invention to provide a novel collet for a dental handpiece.

It is another object of this invention to provide a dental handpiece incorporating a novel chuck assembly.

It is a further object of this invention to provide a straight handpiece embodying a novel collet.

It is a further object of this invention to provide a dental handpiece including a chuck assembly which promotes greater concentricity for a rotating burr held therein.

It is a further object of this invention to provide a dental handpiece embodying a chuck assembly which operates at a reduced noise level.

It is a further object of this invention to provide a dental handpiece incorporating a chuck assembly which provides a secure lock on a dental burr held therein.

These and other objects of this invention are accomplished by providing a collet for a dental handpiece comprising a resilient member having a hollow bore, said member having a first end and a second end, a plurality of parallel slots extending inwardly from said first end and terminating short of said second end, a plurality of parallel slots projecting inwardly from said second end and terminating short of said first end, said member having a circular transverse cross-section and including at least one raised portion formed on its outer surface, and a tapering wall projecting up to said raised portion from a lower portion on the surface of said member.

Other objects and many of the attendant advantages of this invention will be readily appreciated as the same becomes better understood by reference to the following detailed description when considered in connection with the accompanying drawings wherein.

Figure 1:
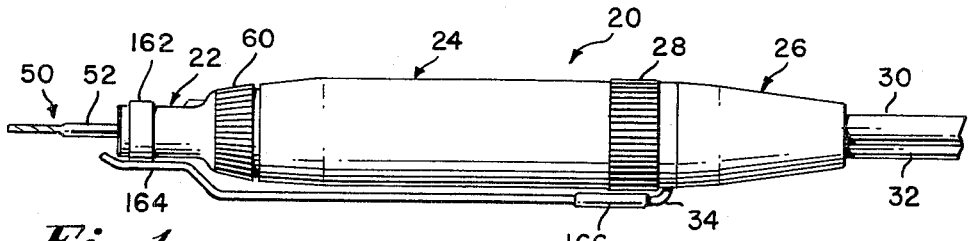
FIG. 1 is a side elevational view of a straight handpiece embodying the collet of this invention.

Referring now in greater detail to the various figures of the drawings wherein similar reference characters refer to similar parts, a dental handpiece embodying the collet of the present invention is generally shown at 20 in FIG. 1. Device 20 basically comprises a nose 22 and a tubular housing including a front section 24 and a rear section 26. The front and rear sections are joined together through an internally threaded collar 28. An air tube 30 and a water tube 32 enter through the rear of handpiece 20 and are connected to adaptors in a manner well known to the art. The water entering through tube 32 leaves the handpiece through conduit 34.

Figure 2:
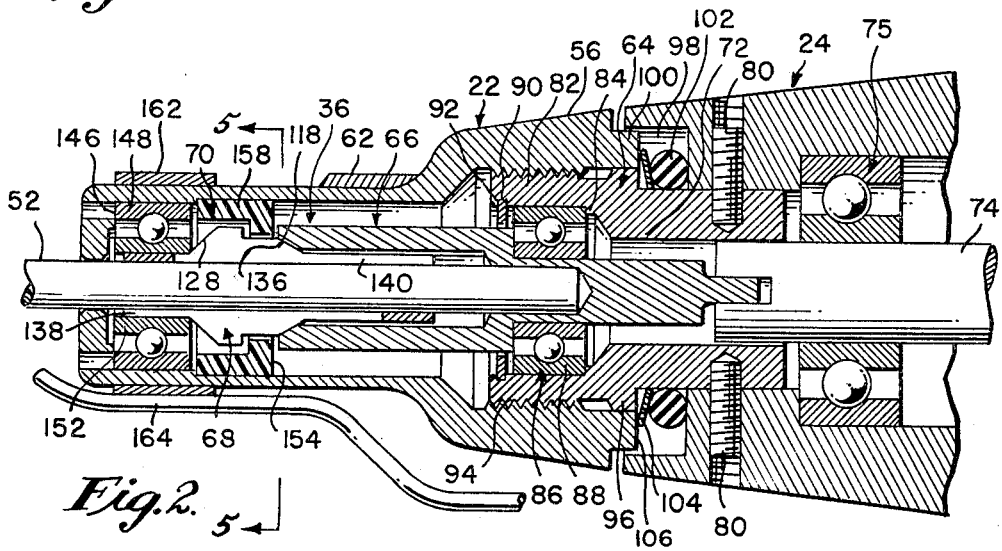
FIG. 2 is an enlarged sectional view of the forward end of the handpiece of FIG. 1, and shows the shank of a dental burr as secured within the collet of this invention.

Nose 22 houses a chuck assembly 36 (FIG. 2). The front and rear tubular sections 24 and 26 house an air motor, suitable gearing, and water and air inlet conduits. An example of a handpiece embodying these elements can be found in our aforementioned application Ser. No. 346,336. However, the specific means for applying rotative power to the chuck forms no part of this invention. Thus, the collet and chuck assembly of this invention can be used with any rotative power system known to the dental art. Thus, the chuck assembly can be used equally well with an air turbine handpiece, an air motor handpiece, or a belt-and-pulley handpiece.

Figure 3:
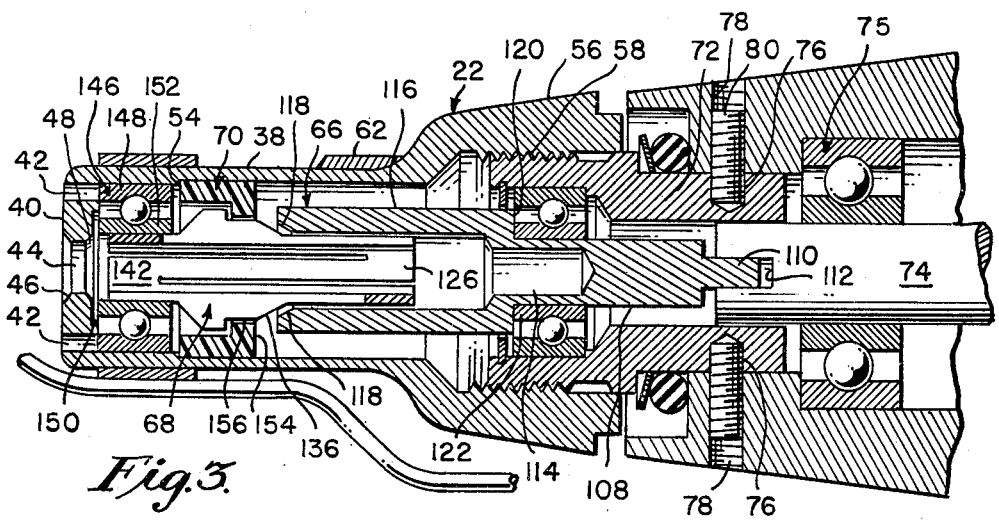
FIG. 3 is a sectional view similar to FIG. 2, but shows the collet with the shank removed.
Figure 4:
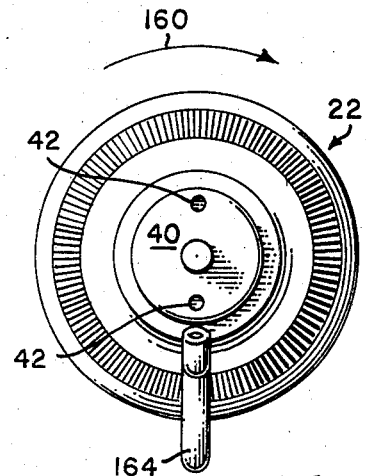
FIG. 4 is a front elevational view of the handpiece of FIG. 1.
Figure 9:
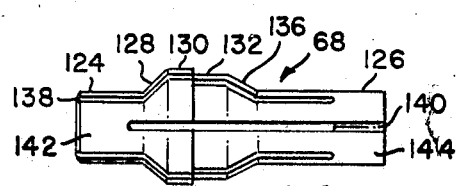
FIG. 9 is a top plan view of the collet of this invention.

As best seen in FIGS. 2 and 3, the forward portion 38 of nose 22 is basically tubular. As seen in FIG. 4, the front of nose 22 is closed by wall 40. Wall 40 is unitary with the remainder of nose 22. An upper and lower hole 42 is formed in wall 40. As seen in FIG. 4, holes 42 are vertically aligned, and have their centers on a line which passes through the center of wall 40. A central opening 44 is formed in wall 40. Both sides of opening 44 are bevelled, as shown at 46 and 48 in FIG. 3. The purpose of hole 44 is to permit the insertion of a dental burr 50 (FIG. 1) having a shank 52. Having the bevelled surfaces 46 and 48 aids in the insertion and removal of the shank 52. A small annular shoulder 54 is formed on the interior of the front portion 38 of nose 22. The purpose of this shoulder will be explained hereinafter.

The rear portion 56 of nose 22 is also hollow, but of a larger internal diameter than forward portion 38. Rear portion 56 is internally threaded as shown at 58. The outer surface of portion 56 tapers outwardly and is knurled as shown at 60 in FIG. 1. The purpose of the knurling is to aid in grasping and rotating the nose 22 to advance it along its internal threads, as will be explained hereinafter. An elongated boss 62 is formed on the outer surface of nose 22. The purpose of the boss is to aid in the securement of a contra-angle attachment on the handpiece of this invention. The use of a contra-angle attachment on a straight handpiece is well known in the art and forms no part of this invention. The manner of securing contra-angle attachments in a straight handpiece is described in our aforementioned co-pending application Ser. No. 346,336.

The chuck assembly 36 basically comprises a rear bearing housing 64, a collet shaft 66, a collet 68, and a collet retainer 70. As seen in FIGS. 2 and 3, rear bearing housing 64 is hollow and includes its smallest diameter at its rear end 72. The internal diameter of rear end 72 is slightly larger than the outer diameter of rotor shaft 74 of the handpiece. Rotor shaft 74 is connected to the source of power for the handpiece and can be the rotor of an air motor drive. As is apparent from FIGS. 2 and 3, the rotor shaft is freely rotatable within the rear portion 72 of rear bearing housing 64 without contacting the same. Suitable bearings, such as ball bearing 75, are provided for the rotor shaft.

The rear portion 72 of the rear bearing housing includes a pair of aligned tapped holes 76. These holes are aligned with tapped holes 78 in section 24 of the handpiece housing. Rear bearing housing 64 is secured to section 24 by set screws 80 threadedly mounted in holes 76 and 78.

Front section 82 of the rear bearing housing has a larger internal diameter than rear section 72. An annular shoulder 84 is formed within front section 82. A rear ball bearing 86 is secured within front section 82 by a pressed fit. Thus, the outer race 88 is firmly secured against the inner surface of front section 82. The insertion of the ball bearing is carried out by forcing the ball bearing into place until the rear edge of the outer race abuts annular shoulder 84. The ball bearing 86 is maintained in place against inadvertent removal by retainer ring 90. Retainer ring 90 is a metal spring steel ring having a central portion removed. The diameter of ring 90 can be reduced by bringing the two ends adjacent the removed central portion together. The ring is then inserted into an annular slot 92 in front portion 82. The ring is then permitted to expand to its natural diameter and in this condition will be maintained in place. If the ball bearing 86 should be moved forwardly, the outer race will abut the ring 90 thereby preventing inadvertent removal.

The outer surface of forward portion 82 is threaded as shown at 94. Threads 94 are complementary to threads 58 on nose 22, and thus the nose 22 is threadedly secured on rear bearing housing 64. An annular shoulder 96 is formed on the outer surface of rear bearing housing 64 at a position rearward of threads 94.

Tubular housing 24 is provided with an annular recess 98 in its forward wall. Nose 22 includes ring 100 which is receivable in recess 98. A resilient O-ring 102 is positioned in recess 98. O-ring 102 can be made of rubber or plastic and is of a diameter which is slightly larger than the outer diameter of rear section 72 of rear bearing housing 64. Positioned forwardly of O-ring 102 is an O-ring washer 104. O-ring washer 104 is made of a rigid material, such as spring steel, and has its wall projecting outwardly in going from its center to its outer circumference. The angle of inclination is approximately 15° from the vertical, as seen in FIGS. 2 and 3. When a dental burr is secured in the handpiece of this invention, O-ring washer 104 will abut the rear edge 106 of ring 100.

Collet shaft 66 includes a solid cylindrical rear section 108. Section 108 includes a flat rectangular boss 110 projecting from the rear thereof. Boss 110 is received in a slot 112 of rotor shaft 74. It is thus seen that boss 110 is keyed in rotor shaft 74 and will rotate when the rotor shaft is rotated. The forward portion of cylindrical section 108 includes a central bore 114. This bore is of a sufficient diameter to receive the shank 52 of a dental burr, as shown in FIG. 2. The forward portion 116 of collet shaft 66 is tubular but includes an outwardly tapering edge 118 projecting from the center thereof. Rear section 108 joins front section 116 at wall 120. This wall abuts inner race 122 of ball bearing 86. The entire collet shaft 66 is secured to the inner race 122 by a pressed fit.

Collet 68 is best seen in FIGS. 6, 7, 8, 9, and 10. The collet is cut from a solid block of resilient metal such as spring steel. The front section 124 and the rear section 126 are tubular and have the same internal and external diameter. Proceeding rearwardly from front section 124 there is a first tapering outer surface 128. Surface 128 terminates in flat surface 130. A second flat surface 132 is formed rearwardly of flat surface 130. However, the outer diameter of flat surface 132 is less than that of surface 130 and therefore a shoulder 134 is formed on the collet. Flat surface 132 is joined with rear section 126 by a second tapering surface 136.

As is apparent from FIG. 3, the internal diameter of collet 68 is constant and all changes in dimensions occur on the outer surface.

Figure 7:
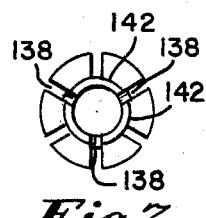
FIG. 7 is a front elevational view of the collet of this invention.
Figure 6:
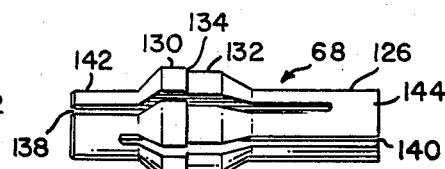
FIG. 6 is a side elevational view of the collet of this invention.
Figure 8:
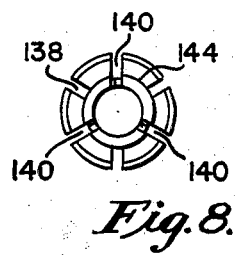
FIG. 8 is a rear elevational view of the collet of this invention.
Figure 10:
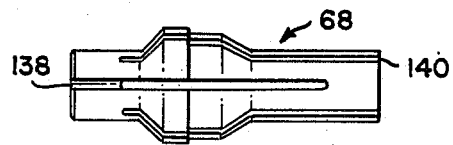
FIG. 10 is a bottom plan view of the collet of this invention.

Three equally spaced slots 138 project inwardly from the edge of front section 124. Each of these slots terminates in rear section 126 a short distance before the rear edge thereof. Likewise, three equally spaced slots 140 project inwardly from the rear edge of rear section 126. These slots terminate in front section 124 and short of the front edge thereof. Slots 138 and 140 by-pass each other. As seen in FIGS. 7 and 8 slots 138 and 140 are all equally spaced. Slots 138 divide front section 124 into three jaws 142. Likewise, slots 140 divide rear section 126 into three jaws 144.

As seen in FIGS. 2 and 3 a ball bearing 146 is positioned in the front of nose 22. The ball bearing is maintained in place by a pressed fit between outer race 148 and the inner surface of front section 38. Outer race 148 abuts the inner surface of wall 40. Wall 40 additionally includes an inner recess 150 whereby inner race 152 will be laterally spaced from wall 40. In this manner, rotation of the inner race can be accomplished without any interference from the forward wall 40.

In assembling the handpiece of this invention, front section 124 of the collet is inserted into ball bearing 146. The inner diameter of inner race 152 is substantially the same as the outer diameter of front section 124. Thus, there will be little, if any, compression on the jaws 142 caused by this insertion. After the collet has been inserted into the ball bearing in nose 22, collet retainer 70 is inserted. Collet retainer 70 comprises a disc 154 having a central opening 156. The diameter of opening 156 is slightly greater than the outer diameter of section 132 of the collet. An integral annular flange 158 projects forwardly from disc 154. The inner diameter of flange 158 is greater than the outer diameter of section 130 of the collet.

Collet retainer 70 is made of a resilient plastic material such as nylon. Its outer diameter is such that it will provide a frictional fit on the interior of nose 22. However, due to the resilient nature of the plastic, it can be forced out of the nose by pressure against its forward edge.

In use, collet retainer 70 is inserted into nose 22 after the collet has been inserted. The collet retainer is pushed forward until its forward edge abuts shoulder 54 (FIG. 3). Once inserted, it will retain its position until pushed laterally rearward. As seen in FIG. 3, the collet 68 is maintained within nose 22 by the ball bearing 146 and the collet retainer 70. Thus, if for any reasons, such as cleaning, the nose 22 is removed from rear bearing housing 64, the collet will not fall out of place. Additionally, the lateral orientation of the collet is maintained by the edge of opening 156 and the ball bearing 146. Thus there is very little room for the collet to depart from its substantially central alignment within the nose.

After the collet has been secured within the nose, the nose is threadedly secured on rear bearing housing 64. The condition of the handpiece at this time is shown at FIG. 3. As further seen in FIG. 3, the rear end 126 of the collet is received in the forward section 116 of collet shaft 66. The tapered front edge 118 aids in the placing of the collet within the shaft. With the handpiece in the condition shown in FIG. 3, there is substantially no lateral pressure against the jaws of collet 68. Thus it is relatively easy to insert the shank 52 of a dental burr 50 into the collet with the handpiece in this condition. After the shank has been inserted, nose 22 is rotated in a clockwise direction, as indicated by the arrow 160 in FIG. 4. This advances the nose 22 along the threads 94 of the rear bearing housing 64. As the nose is rotated, the collet 66 will be drawn rearward until tapered surface 118 of collet shaft 66 abuts tapered surface 136 of the collet. This causes the depression of rear jaws 144 and a consequent partial closing of slots 140. As seen in FIG. 2, the taper 136 is complementary with the taper 118. Simultaneously with the closing of the rear jaws, the front jaws will also be closed by the abutment of the inner race 152 against the tapered front surface 128 of the collet.

As seen in FIG. 2, once the shank 52 has been inserted and the nose 22 advanced in the manner described, the dental burr will be rigidly locked in place. Thus there is a lateral pressure caused by the forward jaws 142 and an additional lateral pressure caused by the rear jaws 144. Subsequent rotation of the rotor shaft 74 will cause a consequent rotation of collet shaft 66 which is fixed to inner race 122 of ball bearing 86. Since the collet 68 is secured to collet shaft 66 by the frictional engagement at the forward end of the collet shaft, the collet will likewise be rotated. There is also a frictional engagement between the forward end of the collet and the inner race 152 of forward ball bearing 146. Thus, this inner race will also be rotated.

As seen in FIG. 2, when the nose 22 is in its position whereby the collet is locked in place, it will abut the forwardmost edge of O-ring washer 104. At the same time, resilient O-ring 102 will be slightly depressed. The lateral pressure applied by O-ring 102 against the nose 22 through the O-ring washer 104 serves to lock the nose in place and prevent inadvertent loosening of the grip on the collet during the use of the handpiece. Thus, the O-ring and its associated washer serve as a lock washer for the nose when the nose is in its locking position.

When it is desired to remove the collet, the nose is rotated in a counterclockwise direction. This removes the pressure of inner race 152 against tapered surface 128. Likewise, the pressure of tapered surface 118 of collet shaft 66 against the collet will also be lessened when the nose is withdrawn from its locking position. With the pressure removed, it is a relatively simple matter to merely pull dental burr 50 from the collet.

Should it ever become necessary to remove the collet 68 from the forward ball bearing 146, the ball bearing, collet and collet retainer 70 can easily be removed from the nose 22. This is accomplished by using a tool comprising a base and a pair of spaced upstanding pins. The nose is removed from the rear bearing housing 64 by rotating it in a counterclockwise direction. Thereafter, the nose is telescoped over the pins on the tool by inserting the pins in aligned holes 42. By pushing the nose downwardly, the pins will abut the outer race 148 and force the outer race, collet and collet retainer from the nose. These elements or substitute elements can then be reinserted in the manner described above.

Figure 5:
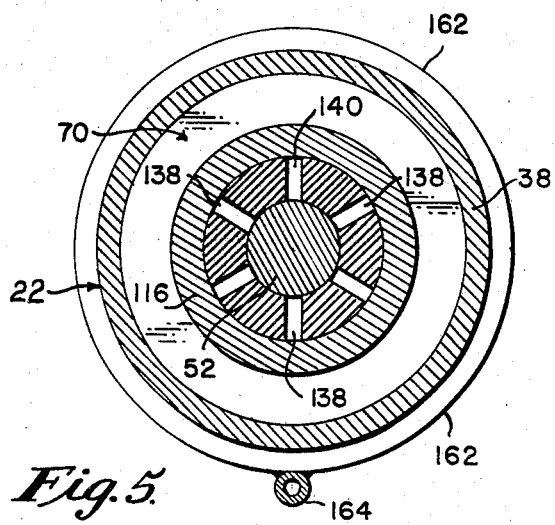
FIG. 5 is an enlarged sectional view taken along the line 5—5 of FIG. 2.

The handpiece of this invention can include any of the attachments normally used for a handpiece. Thus, a collar 162 is telescoped over the front of nose 22. A spray tube 164 is welded to collar 162 as best seen in FIG. 5. The forward portion of spray tube 164 is angled inwardly toward dental burr 50, as best seen in FIG. 1. The rear end of water spray tube 164 is connected to water conduit 34 by a flexible tube 166. Tube 166 can be any flexible material such as rubber or a plastic, such as Tygon. Having the flexible connection 166 permits the adjustment of the position of water spray tube 164. Thus, for relatively short burrs, it may be desirable to slide collar 162 rearward on nose 22. Any adjustment in position can be accommodated by forcing the rear end of water tube 164 further into flexible connection 166. For longer burrs, the collar 162 may be slid forwardly and an appropriate adjustment can be made in flexible tube 166.

The water emanating from tube 164 can either be a mixture of air and water, which would be accomplished through an appropriate conduit connected to air and water tubes 30 and 32 or can be pure water supplied under pressure. The purpose of the water is to lubricate the cutting area and to wash away any of the cut chips of the tooth. The use of water sprays on handpieces of this type is common in the art.

Having a positive grip on two positions of the burr 50 aids in the concentricity of the rotating burr. This increased concentricity is further accomplished by the fact that all play has been taken out of the front and rear ball bearings. Thus, there is normally a small amount of lateral movement between the inner and outer race in a ball bearing. This is because the ball grooves are slightly larger than the diameters of the balls. However, when the collet is secured in the handpiece of this invention there is a lateral pressure applied against the inner races of both the front and rear ball bearings. This pressure is supplied by tapered surface 128 on the front ball bearing and by edge 120 of the collet shaft on the rear ball bearing. With the burr secured in place and this lateral pressure against the ball bearings all play has been removed. For this same reason, the applying of pressure against the ball bearings reduces the noise level of the handpiece during its operation.

Obviously many modifications and variations of the present invention are possible in the light of the above teachings. It is, therefore, to be understood that within the scope of the appended claims, the invention may be practiced otherwise than as specifically claimed.

What is claimed as the invention is:

1. A dental handpiece comprising a housing, a nose threadedly mounted on said housing, chuck means rotatably mounted within said nose, said chuck means including a collet, said collet comprising a resilient member having a hollow bore, said member having a first end, a second end and an outer surface, a plurality of parallel slots extending inwardly from said first end and terminating short of said second end, a plurality of parallel slots projecting inwardly from said second end and terminating short of said first end, said slots dividing said first end and said second end into a plurality of jaws, said member having a circular transverse cross-section and including a first raised portion formed on its outer surface and a first tapering wall projecting up to said first raised portion from a lower portion on the surface of said member, said member further including a second raised portion formed on its outer surface and a second tapering wall projecting up to said second raised portion from a lower portion on the surface of said member, said nose having a ball bearing within the forward portion thereof, said first end of said collet being positioned within said ball bearing, said first tapering wall adapted to be contacted by the inner race of said ball bearing when said nose is moved longitudinally along its threads, whereby the jaws formed on said first end will be compressed, means within said housing adapted to contact said second tapering wall when said nose is moved along its threads, whereby the jaws formed on said second end will be compressed, and a collet retainer mounted within said nose, said collet retainer being adapted to retain said collet within said nose when said nose is threadedly removed from said housing.

2. The dental handpiece of claim 1 and further including means for resiliently engaging said nose when said nose is positioned for compressing said collet.

3. The dental handpiece of claim 2 wherein said resilient means comprise a resilient O-ring washer positioned in said housing, said O-ring washer being adapted to contact said nose.

4. The dental handpiece of claim 1 wherein said collet retainer comprises a disc having a central opening, said collet being positioned within said central opening and spaced therefrom, and an annular wall which frictionally engages the interior surface of said nose.

5. The dental handpiece of claim 1 wherein said nose includes a front wall with the outer race of said ball bearing being adjacent said front wall, said front wall including at least one opening passing therethrough whereby said ball bearing can be removed by pushing a pin through said opening and against said ball bearing.

6. The dental handpiece of claim 1 wherein said means adapted to contact said second tapering wall comprises a collet shaft, said collet shaft having a tapering end adapted to contact said tapering surface on said second raised portion.

7. The dental handpiece of claim 6 wherein said chuck means includes a rear ball bearing, with the inner race of said rear ball bearing engaging said collet shaft whereby a lateral pressure will be placed against said ball bearing in said nose by said collet and a lateral pressure will be placed against said rear ball bearing by said collet shaft when said nose is moved rearwardly on said threads.

8. The dental handpiece of claim 4 wherein said collet includes a shoulder, said shoulder being positioned between said ball bearing and said disc.

References Cited

UNITED STATES PATENTS

| | | |
|---|---|---|
| 1,185,762 | 6/1916 | Bohlig. |
| 2,193,890 | 3/1940 | Strobl _____ 279—51 |
| 2,660,441 | 11/1953 | Toelcke _____ 279—48 X |
| 2,672,789 | 3/1954 | Cross et al. |

FOREIGN PATENTS

| | | |
|---|---|---|
| 1,027,020 | 2/1953 | France. |
| 487,576 | 12/1929 | Germany. |
| 446,149 | 4/1936 | Great Britain. |
| 414,356 | 7/1946 | Italy. |
| 208,396 | 5/1940 | Switzerland. |

ROBERT C. RIORDON, Primary Examiner

U.S. Cl. X.R.

279—47, 51